United States Patent [19]
Woolf et al.

[11] 3,806,652

[45] Apr. 23, 1974

[54] ELAPSED-TIME TELEPHONE MONITOR SYSTEM

[75] Inventors: Julius Isadore Woolf, Teaneck, N.J.; Roman Sadowy, Jr., New York, N.Y.; Russell John Gershman, Englewood Cliffs, N.J.

[73] Assignee: Information Flow, Incorporated, Dobbs Ferry, N.Y.

[22] Filed: July 16, 1973

[21] Appl. No.: 379,764

Related U.S. Application Data

[63] Continuation-in-part of Ser. No. 154,878, June 21, 1971, abandoned.

[52] U.S. Cl. .......... 179/7.1 R

[51] Int. Cl. .......... H04j 15/18, H04j 15/22

[58] Field of Search .......... 179/7.1 R, 7.1 TP, 15 AL; 340/413, 172.5

[56] References Cited

UNITED STATES PATENTS

| | | | |
|---|---|---|---|
| 3,517,130 | 6/1970 | Rynders | 179/15 AL |
| 3,544,976 | 12/1970 | Collins | 179/15 AL |
| 3,539,998 | 11/1970 | Belcher | 340/172.5 |
| 3,546,381 | 12/1970 | Foley | 179/7.1 R |

FOREIGN PATENTS OR APPLICATIONS

| | | | |
|---|---|---|---|
| 1,108,462 | 4/1968 | Great Britain | 179/15 AL |

*Primary Examiner*—Kathleen H. Claffy
*Assistant Examiner*—David L. Stewart

[57] ABSTRACT

A telephone monitor system having a plurality of monitors each connected in parallel to a separate telephone line to be monitored and communicating through parallel buss lines to a central record unit. The monitor counts the pulses of each digit dialed and stores the digits in a number register. It determines if an area code has been dialed and if a leading "1" has been dialed and accommodates for them. After the number has been stored it signals the user to enter an identification number which is also detected and stored in sequence. When the audible ring on the telephone line ends, the monitor begins counting the elapsed time and also requests time service of the central record unit. The central record unit sequentially interrogates the monitors until it detects one requesting service. When it detects a time service request it transfers the real time from a real time clock in the record unit to the monitor requesting service and then resumes sequential interrogation. When the call is completed, the monitor stops counting the elapsed time and requests record service of the central record unit. When the record unit detects a record service request it transfers the number called, the identification number, the elapsed time and the real time from the monitor to the central record unit. It resets the monitor and resumes sequential interrogation.

29 Claims, 7 Drawing Figures

INVENTORS
JULIUS ISADORE WOOLF
ROMAN SADOWY, JR.
RUSSELL JOHN GERSHMAN

INVENTORS
JULIUS ISADORE WOOLF
ROMAN SADOWY, JR.
RUSSELL JOHN GERSHMAN

INVENTORS
JULIUS ISADORE WOOLF
ROMAN SADOWY, JR.
RUSSELL JOHN GERSHMAN

ELAPSED-TIME TELEPHONE MONITOR SYSTEM

This invention is a Continuation-In-Part application of U.S. Ser. No. 154,878 filed on June 21, 1971 and now abandoned.

This invention relates to telephone systems and more particularly to an automatic recording system for requesting the time and duration of telephone calls dialed on telephones being monitored.

BACKGROUND OF THE INVENTION

With the expanded use of telephones by business and private users, there has developed a great concern over the amount of billing for telephone use. As direct dialing has been introduced, the amount of the telephone billing has even further increased. While the telephone companies have their own elaborate billing systems and periodically submit bills to subscribers, these do not adequately provide for the needs of the subscribers. The bills generally come at infrequent periods, usually on a monthly basis, and for many types of business arrangements this is not sufficient.

For example, in major hotels, telephones are conveniently located in each room and any use of the telephones by the guests are charged to the bill at check out time. Since the hotels cannot wait for the monthly telephone bill to determine the proper charges to be added to the guest's bill, it is generally necessary to have an operator constantly monitor the calls and calculate the charges of each call made based upon the location and duration of the call. This requires additional personnel and is very susceptible to error and miscalculation.

In addition, the regular telephone company bill is usually based on exchange numbers. Most PBX or PABX systems having numerous internal numbers will not be able to break down the total bill to individual telephones. Furthermore, the bill does not include the time of each call, and accordingly it is not possible to determine when the calls were made.

As a result, many subscribers have installed local automatic call accounting systems which monitor each telephone and record appropriate information for each call whereby individual billing can be automatically calculated for the call. Some of these systems require separate monitor and recording units for each telephone. When a call is dialed, the monitor unit notes various information including generally the called number and the duration of the call, and the recording unit calculates the amount of the bill. By using a separate monitor and recording unit for each telephone, the company can determine the billing from each phone individually.

However, such automatic accounting systems are expensive and impractical since they require duplication of equipment for each telephone. Other systems are arranged to have separate monitor units for each telephone and a single recording unit for a few lines. Among these systems one type signals the recording unit when a telephone call is begun and retains control over the recording unit until the call is completed. However, this type of system is also impractical since the recording unit is tied to one monitor for each call and will not be available to record information from other monitors during the interim.

Other types of systems using a single recording unit with multiple monitoring units transmit information from the monitor unit to the recording unit as information becomes available. At the initiation of a call the dialing number is transmitted. After a number is called, the dialed number is transmitted, and at the conclusion of the call the duration time is transmitted. As a result, the information in the recording unit is not correlated and suitably designed additional equipment is required to correlate items from the same call.

Still other types of this system retain the information in the monitor units until the conclusion of the call and then transmits the information to the single recording unit. However, the monitor unit must then have the capability for determining all the information desired. For example, if the time, day and date of occurrence of each call is desired, a separate long clock must be installed in each monitor unit. This duplication of devices adds to the cost and complexity of such systems. As a result, most of these systems merely monitor the duration of the call but not the real time of the call.

Furthermore, these prior art systems cannot detect the presence or absence of an area code dialed with the number. Also, in the prior art systems, the number of the dialing phone is included as part of the information. However, if more than one person has access to a particular phone, it is not possible to determine which individual made the call since only the phone used can be monitored not the individual using the phone.

Accordingly, it is an object of this invention to provide an automatic telephone monitor system which avoids the aforementioned problems of the prior art.

A further object of the invention is to provide a telephone monitor system capable of recording the real time of occurrence of each telephone call as well as the duration of each call.

Still another object of the invention is to provide a telephone monitor system capable of recording for each call, the number dialed and the identification number of the user of the telephone.

Still another object of the invention is to provide a monitor unit associated with each telephone to be monitored and a single recording unit using a polling arrangement to interrogate each of the monitor units.

Yet another object of the invention is to provide a telephone monitor system which can detect the presence or absence of an area code dialed in conjunction with the telephone number.

A further object of the invention is to provide a telephone monitor system requiring a single clock to record the real time of the call and wherein a plurality of monitor units have access to the clock.

Still a further object of the invention is to provide a telephone monitor system which attaches to a telephone subscriber's truck lines without affecting normal telephone operation.

Yet another object of the invention is to provide a telephone monitor unit which registers the telephone number dialed, the user identification number, the real time of the telephone call and the duration of the call, and transmits the information in a correlated manner to a central recording unit.

A further object of the invention is to provide a telephone monitor system which will only record information for billable calls and will not record information for toll free calls.

A still further object of the invention is to provide a telephone monitor system which will record the information concerning each completed call in a form suitable for computer manipulation.

Yet another object of the invention is to provide a a telephone monitor system which will detect the presence or absence of a leading "1" dialed before the telephone number.

Another object of the invention is to provide a telephone monitor system for use with a PBX, PABX, public or home telephone unit.

A further object of the invention is to provide a simple, feasible and novel telephone monitor system.

BRIEF DESCRIPTION OF THE INVENTION

Briefly this invention consists of a plurality of monitor units each connected to a different telephone being monitored. The monitor units are connected in parallel to a group of buss lines which interconnect the monitor units with a central record unit. Each monitor unit detects and decodes the telephone number dialed together with the presence or absence of an area code and a leading "1" and stores the number in a number register. This process is described more fully in our copending application Ser. No. 152,538 filed on June 14, 1971 and entitled "Limited Access Dialing System." After the number has been stored, the unit signals the user to enter his identification number, which is also decoded and stored into the number register.

When the called party answers the other end of the line, the monitor unit starts an elapsed time counter and also sets up a real time flag. The central record unit sequentially polls the plurality of monitor units and services a unit upon detection of a flag. The real time flag causes a real time clock located in the central record unit to transfer the real time into the monitor unit requesting service and then the sequential polling continues.

When the telephone call is completed, the monitor unit stops the elapsed time counter and sets up a record flag. The central record unit then sequentially retrieves from the line monitor unit the dialed number, including any area code, the user identification number, the duration of the call, and the real time of the commencement of the call. This information is recorded in digital form capable of use in further processing. Following recording of the information, the monitor unit is reset and sequential polling continues.

The telephone monitor system briefly described, together with additional features and advantages thereof will be explained in detail with reference to a preferred embodiment of the system illustrated in the accompanying drawings.

DETAILED DESCRIPTION OF THE INVENTION

Figure 1:
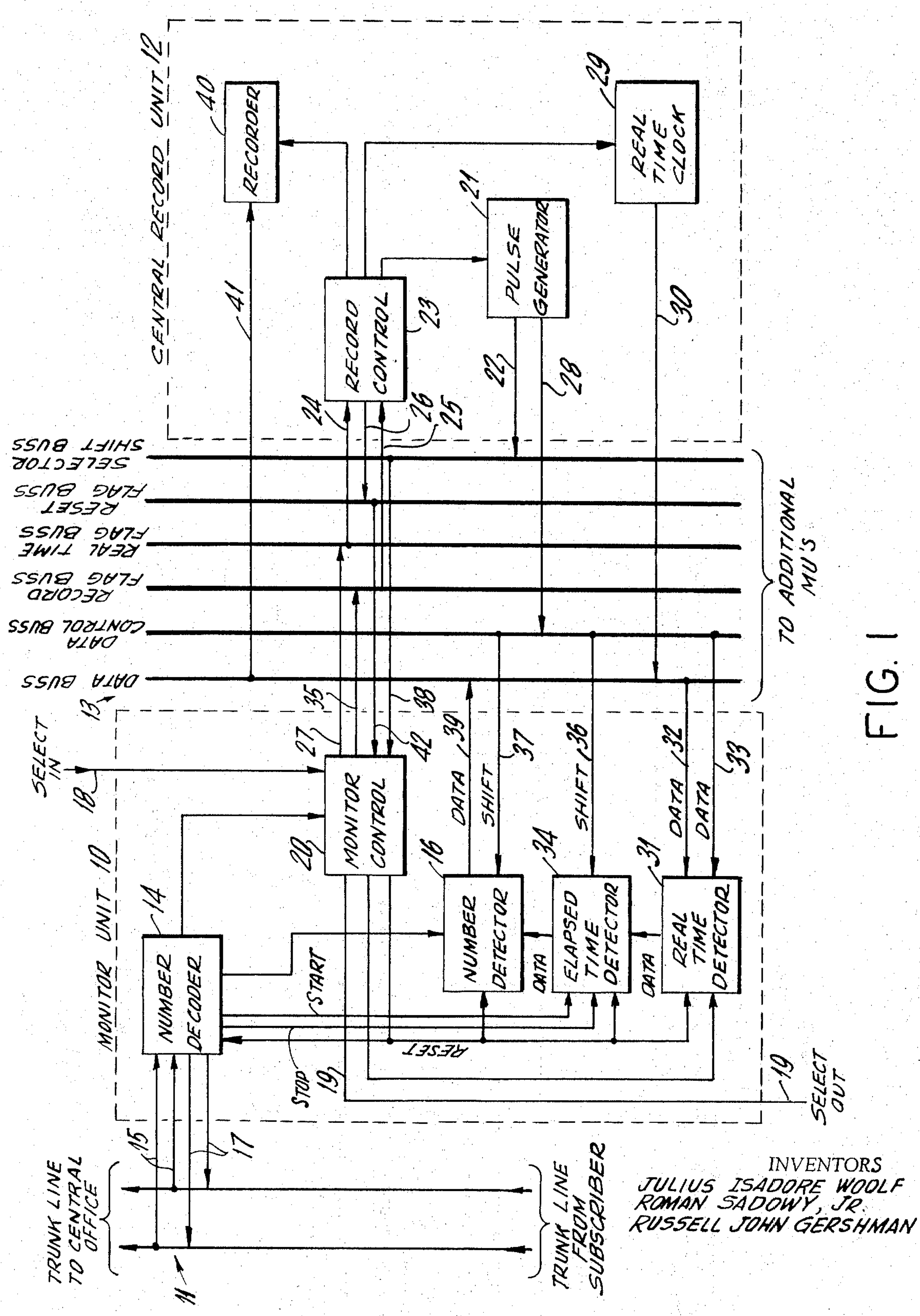
FIG. 1 represents a functional block diagram of one embodiment of the telephone monitor system in accordance with the invention.

Referring to FIG. 1, there is shown a monitor unit 10 attached to a trunk line 11 and interconnected to a central record unit by means of a series of buss lines 13. The telephone line is between the individual handset and the out going trunk line to the central office. Thus, on PBX or PABX systems the monitoring would be effected after a trunk line is siezed.

Additional monitor units, not shown, are connected in parallel to the interface busses 13. The monitor units are coupled together by interconnecting a "select out" terminal on a unit with a "select in" terminal on the next monitor unit. The first monitor unit has its "select in" terminal connected directly to the central record unit. Each monitor unit sequentially sends a signal to the next monitor unit after it has been interrogated. The "select in" signal enters on line 18 from the preceding monitor unit to monitor control 20 and after the monitor 10 has been interrogated, the "select out" signal from monitor control 20 proceeds to the next monitor unit on line 19. The central record unit 12, sequentially sends a series of interrogate pulses on the selector shift buss. Although the shift pulse appears on the buss to which all the monitor units are connected, it will only effect the monitor unit which has recieved the "select in" signal from the previous monitor unit. The shift pulse in addition to interrogating the monitor units also causes the select signal to travel to the next monitor unit. When the select signal has travelled through the entire series of monitor units the central record unit sends a new signal to the first monitor unit. The shift pulses are sent from pulse generator 21 to the selector shift buss through line 22 under command of record control 23. The pulses enter the monitor control 20 along line 38. The sequential interrogation continues until record control 23 senses a flag signal on the real time flag buss through line 24 or the record flag buss through line 25, at which time sequential interrogation stops and the central record unit 12 services the monitor unit which had set up the flag. After the monitor unit is serviced, the record control 23 resets the flag by means of line 26 and the reset flag buss, and sequential interrogation continues.

When a number is dialed onto the trunk lines 11, number decoder 14 detects the pulses through lines 15 and decodes them into a series of digits. It determines if a leading "1" has been dialed, in which case the "1" is suppressed, and also determines if an area code has been dialed, in which case it will be stored as part of the dialed number. As the number is decoded, it is temporarily stored in number detector 16.

After the complete number has been dialed by the subscriber, number decoder 14 sends a tone signal onto the telephone line through lines 17 signaling the subscriber to enter an identification number using the standard handset dialing arrangement. The identification number may identify the particular telephone handset being used, or it may identify the subscriber using the handset. These variations can be predetermined and the system will act accordingly. The identification number is decoded by number decoder 14 and is also stored in number detector 16, in sequence following the dialed number.

When the party being called answers his phone to complete the connection, the audible ring on the line stops. Number decoder 14 signals monitor control 20 to send a pulse onto the real time flag buss through line 27. When the central record unit 12 next interrogates monitor unit 10, it detects the real time flag, signals pulse generator 21 to stop sending shift pulses onto the selector shift lines and begins pulsing the data control buss through line 28. The real time clock 29 is signaled to send the current time reading onto the data buss through line 30. The current time data is shifted into real time detector 31 of the monitor unit 10 through lines 32, 33 and is temporarily stored.

Simultaneously with the signaling of the real time detector 31, as the audible ring stops, number decoder 14 also signals elapsed time detector 34 to begin timing the duration of the call.

When the subscriber completes the telephone call and replaces the handset, number decoder 14 signals elapsed time detector 34 to stop timing and to temporarily store the value of the elapsed time. Monitor control 20 is signaled to send a pulse onto the record flag buss through line 35. The next time the central record unit 12 interrogates monitor unit 10, it detects the flag on the record flag buss through line 25 and inhibits further interrogation. Pulse generator 21 then sends shift pulses onto the data control buss along line 28. The shift pulses effect real time detector 31, elapsed time detector 34 and number detector 16 along lines 33, 36, 37 respectively and sequentially shift the stored data through line 39 onto the data buss. The detectors are shown interconnected so that the data stored in real time detector 31 shifts through elapsed time detector 34 and the data from elapsed time detector 34 shifts through number detector 16. In this manner the data proceeds in sequence with the dialed number first, followed by the identification number, the time duration and the real time, in that order.

The complete data concerning the telephone call enters recorder 40 along line 41 under control of record control 23. The information can be stored in recorder 40 for future use to produce a composite or sorted printout, or it can go directly to a computer for further processing including billing and accounting. After the data is stored in recorder 40, record control 23 sends a reset pulse along line 26 onto the reset flag buss. Monitor control 20 receives the pulse on line 42 and resets the individual parts of the monitor unit 10. The central record unit 12 then proceeds with sequential interrogation.

Using the arrangement of FIG. 1, only a single real time clock is required for the entire monitor system. Clocks which accurately register the time as well as the day and date are generally expensive and complex. By using a single clock which is shared by all the monitor units, the monitor system becomes economical and practical. In operation, the monitors requests the time as soon as the called party answers. This time is stored until the call is completed and then the entire block of information concerning the call is recorded in a correlated sequence.

Figure 2A:
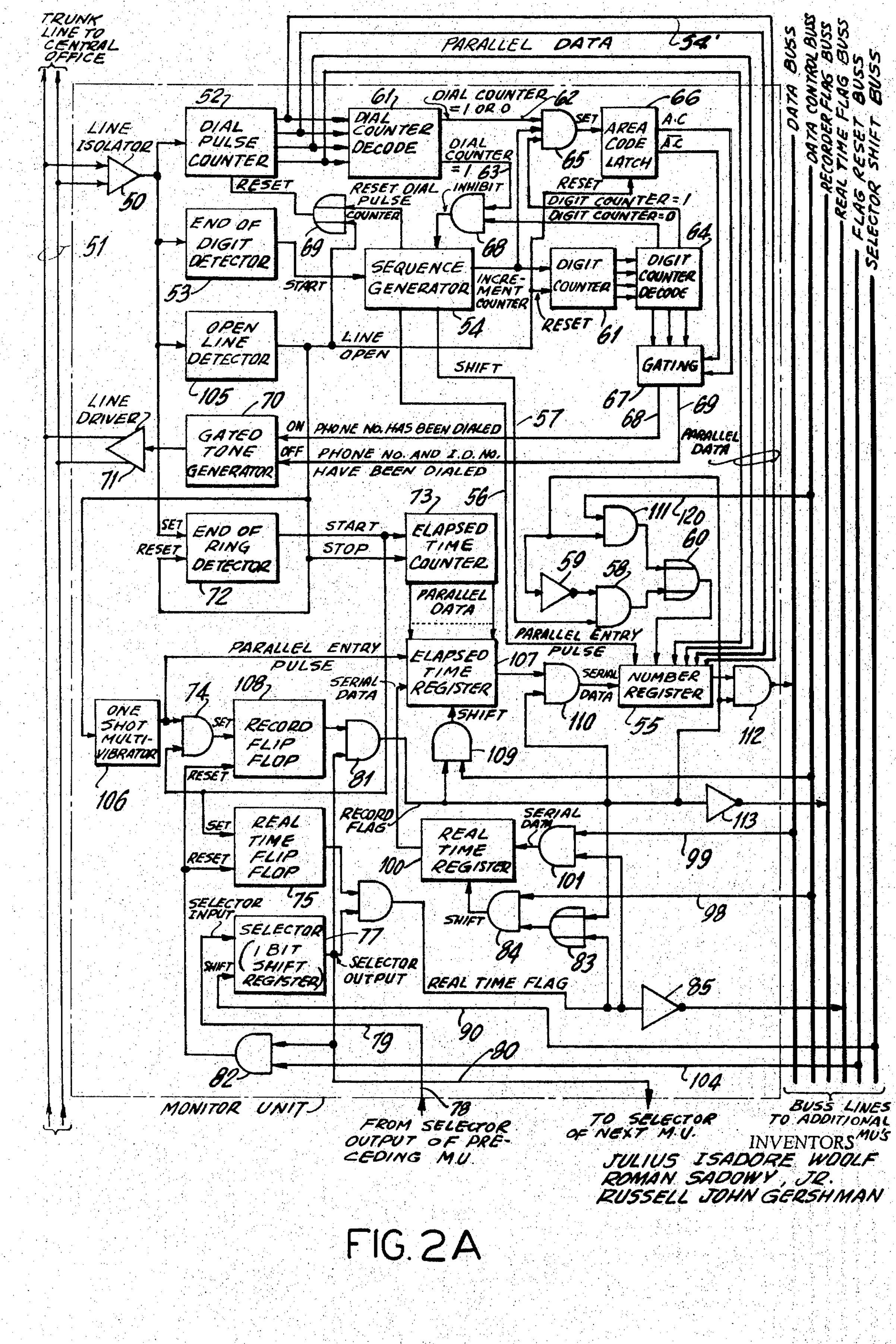
FIGS. 2*a* and 2*b* represent a detailed block diagram of the embodiment shown in FIG. 1.

Referring now to FIG. 2*a* there is shown a detailed block diagram of one embodiment of the monitor unit shown in FIG. 1. The detection of the digits dialed onto the trunk line as well as the determination whether an area code or a leading "1" has been dialed, is explained in detail in copending application Ser. No. 152,538 entitled "Limited Access Dialing System" filed by the same inventors on June 14, 1971. Briefly, line isolator 50 detects the pulses as dialed onto the trunk line 51, and the pulses are counted in dial pulse counter 52. Since the pulses are generated on the telephone line at a fixed rate, end of digit detector 53 waits the fixed interval to sense the presence of a next pulse. Should no subsequent pulse arrive, indicating the end of a digit, a start signal is sent to sequence generator 54 from end of digit detector 53.

The number of dial pulses counted in counter 52, is sent in parallel on line 54' to number register 55. Sequence generator 54 controls the entry of the parallel information on line 56 and shifts the data into the number register 55 with shift pulses on line 57. The shift pulses pass through AND 58 which is enabled by the lack of a signal on the input to inverter 59 causing gate 58 to be open. The shift pulses pass through OR 60 to the number register.

After the digit has been entered into number register 55, sequence generator 54 sends an increment counter pulse to digit counter 61. Initially, during entry of the first digit, digit counter 61 is in a zero state and is therefore one count less than the number of the current digit being entered.

The digit from dial pulse counter 52 passes to dial counter decode 61'. If the digit is a zero, there is an output on line 62 of decode 61'. If the digit is a one, there is an output on both lines 62 and 63 of decode 61'.

The output from digit counter 61 passes to digit counter decode 64 which produces an output when its count is zero, one, seven, ten and thirteen. The one count serves as an input to AND 65 where other inputs are the one or zero digit on line 62 and the increment counter pulse from sequence generator 54. Thus, only if the second digit is a one or a zero will there be an output from AND 65. The presence of such a one or zero indicates that an area code has been dialed, since in accordance with present telephone standards, all area codes have a one or a zero in the second digit position. The output from AND 65 sets area code latch 66 which produces an output signal AC when an area code is present and produces a signal AC in the absence of an area code. The output signals from area code latch 66 controls gating 67.

As explained in the aforementioned copending application, for future operation a new encoding scheme is planned by the telephone companies, and the circuit could be modified to accommodate the new encoding scheme.

The zero output from digit counter decode 64 together with the presence of a dialed one digit on line 63 are inputs to AND 68. An output from gate 68, indicating a leading "1" has been dialed, will inhibit the sequence generator from incrementing counter 61 and will not be detected as a part of the dialed telephone number.

After the dialed digit has been stored in number register 55, digit counter 61 is incremented and the number is tested for an area code or a leading "1." Sequence generator 54 then resets dial pulse counter 52 through OR 69 and the monitor unit 10 is ready for the next dialed digit.

Gating 67 receives signals from digit counter decode 64 after the seventh, tenth and thirteenth dialed digits have been entered. Area code latch 66 controls gating 67 to select either the seventh and tenth signals or the tenth and thirteenth signals. Gating 67 produces a first signal 68 after the telephone number has been dialed, and a second signal 69 after the telephone number and identification number have been dialed. Assuming a three digit identification number, if no area code is dialed, there will be a seven digit telephone number and a ten digit number including both the telephone number and identification number. If an area code has been dialed, the telephone number will have ten digits and together with the identification number there will be thirteen digits. Area code latch 66, after being set by the presence or absence of an area code sets gating 67 accordingly.

After the telephone number of seven or ten digits has been dialed and entered into number register 55, gating 67 produces a signal on line 68 which turns on gated tone generator 70 and sends a tone signal onto the telephone line through line driver 71. The tone signal indicates to the subscriber that he must now dial his identification number. The tone will remain on the line until the identification number has been dialed and entered into the number register. In the event the subscriber fails to dial his identification number in an attempt to avoid the monitoring system, the conversation which will ensue will be muffled by the tone signal and will interfere with audible communication. It is evident that a switch arrangement could be included which would completely interrupt the line after a fixed amount of delay should the subscriber fail to enter his identification number.

As the identification number is dialed onto the line, it is detected and decoded in a similar manner as the telephone number was previously processed, and the identification number is shifted into number register 55 in sequence after the stored telephone number. Upon the full identification number being stored in number register 55, gating 67 sends a signal on line 69 which turns off tone generator 70 and ends the tone signal on the telephone line.

In accordance with existing telephone systems, after a number is properly dialed, an audible ring is heard at the sending end, until the called party picks up his phone and completes the telephone connection. The end of the audible ring, indicating that the called party has picked up his phone, sets end of ring detector 72 which produces a "start" output causing elapsed time counter 73 to begin timing the duration of the call. The "start" signal enables AND 74 and sets real time flip flop 75. The output from the real time flip flop 75 enables AND 76.

The central record unit produces pulses on the selector shift buss which sequentially interrogates the monitor units. The interrogation is described in detail in the afore-mentioned copending application. Briefly, the monitor unit has a selector 77 which is a one bit shift register. Since each monitor unit has such a selector, the total selection system is effectively a long shift register with as many stages as there are monitor units. The central record unit injects a "1" in the first stage when all of the stages are "O." The shift pulses from the central record unit shifts the register and places the "1" in the next successive monitor unit.

As shown in FIG. 2*a*, a particular monitor unit is sequentially interrogated by first receiving a "selector input" signal from the preceding monitor unit on line 78. A pulse from the selector shift buss on line 90 causes a "1" to be placed in selector 77 and a "O" to be placed in the selector of the preceding monitor unit. The shift pulse from the central record unit will only effect the particular selector that contains a "1" and the selector following it, causing the "1" to be shifted from the former to the latter. The selector output on line 80 is sent to the selector input of the next monitor unit. This effectively causes a "1" to be shifted through the series of one bit shift registers from one stage to the next.

The "selector output" also goes to AND gates 76, 81 and 82. If these gates had been previously enabled, the selector output would pass through the gates and a flag be set up to stop further interrogation and obtain service from the central record unit. If these gates had not been previously enabled, then the "selector output" will not halt the central record unit, and interrogation will continue.

As hereinbefore explained, when the audible ring on the telephone handset ends, end of ring detector 72 sets real time flip flop 75 to enable AND 76. The next time the monitor unit is interrogated by the central record unit, and the selector output produces a signal, the signal will pass through enabled gate 76 to set a "real time flag." The flag passes through OR 83 to enable AND 84 and is also inverted by inverter 85 to be placed on the real time flag buss.

Figure 2B:
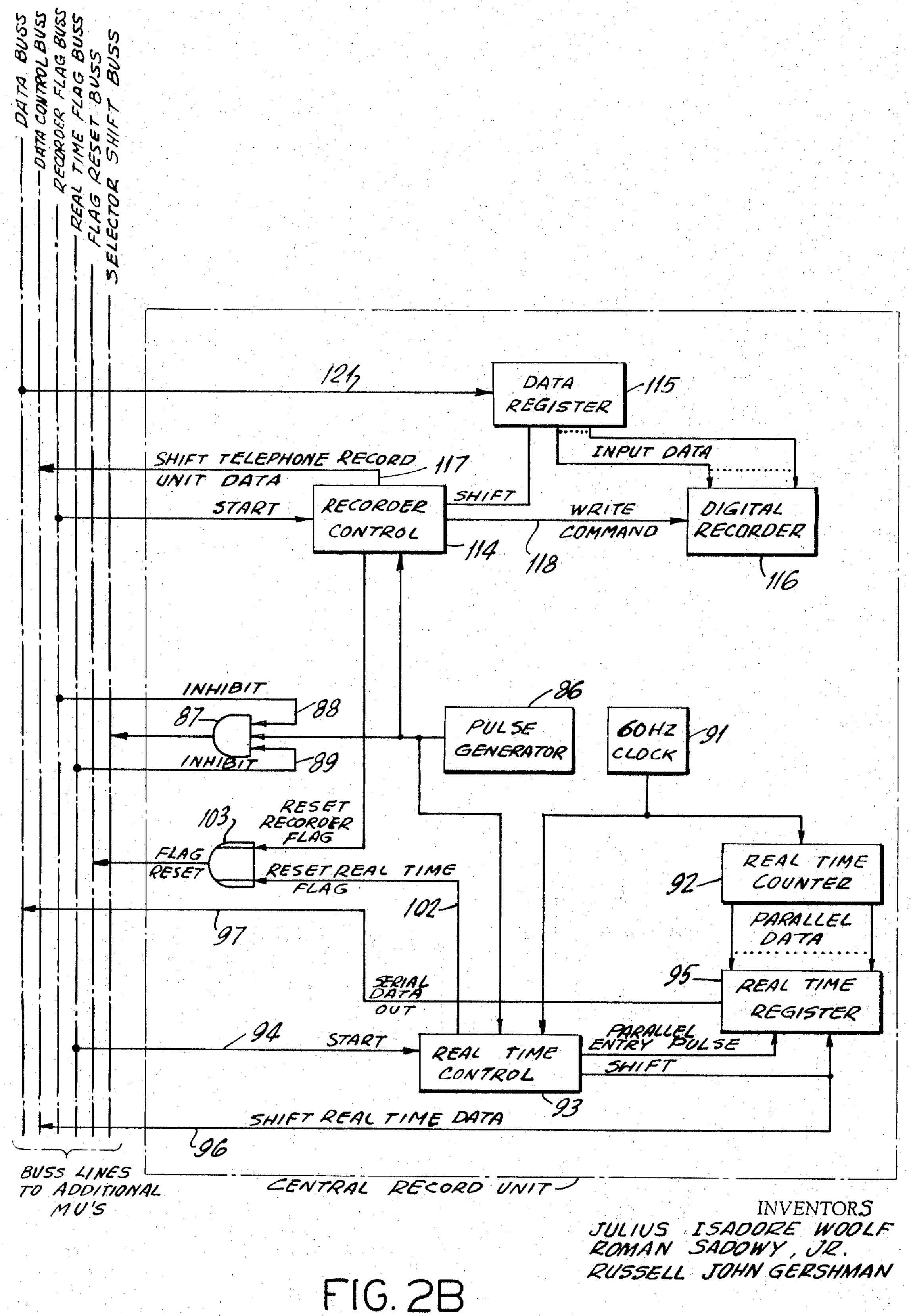

Referring to FIG. 2*b*, there is shown a detailed block diagram of the central record unit. Pulse generator 86 produces a continuous series of pulses which normally pass through AND gate 87 since the inhibit lines 88, 89 are not effective. The pulses passing through AND 87 are placed onto the selector shift buss for sequential interrogation of the monitor units. The 60 HZ clock 91 is a pulse generator that produces 60 pulses every second. These pulses are counted by real time counter 92 which is of sufficient length to store the time of day, the day of the month and the month. The 60 HZ clock is also supplied to real time control 93 in order to synchronize the generator of the parallel entry pulse to real time register 95.

The monitor unit sets a real time flag on the real time flag buss by placing a pulse through inverter 85. The pulse passes to AND 87 of the central record unit as an inhibit on line 89. The real time flag pulse also serves as a start pulse to real time control 93 along 94. Real time control 93 sends a parallel entry pulse to real time register 95 to store the time recorded in real time counter 92. It then directs shift pulses from pulse generator 86 to both the real time register 95 in the central record unit, as well as onto the data control buss along line 96. The real time stored in real time register 95 is shifted onto the data buss along line 97.

Referring again to FIG. 2*a*, the shift pulses on the data control buss enter real time register 100 in the monitor unit along line 93 through AND 84 which had been previously enabled by the real time flag. The serial data on the data buss representing the real time enters real time register 100 along line 99 through AND 101 which had also been previously enabled by the real time flag. It will be appreciated that although the real time data and the shift pulses appear to all the monitor units connected onto the buss lines, only the monitor unit which had set up the flag will have the gates associated with the real time register in an enabled state and only that monitor unit will store the time.

In operation, after the real time flag is set, the central record unit is inhibited from further sequential polling. Real time control 93 transfers the real time to real time register 95 and then shifts this time into real time register 100 associated with the monitor unit. Real time control 93, then sends a reset real time flag signal on line 102 through OR gate 103 onto the reset flag buss. The reset signal enters the monitor unit (FIG. 2*a*) on line 104 and passes through enabled gate 82 to reset real time flip flop 75 thereby removing the real time flag signal. The inhibit on line 89 (FIG. 2*b*) is removed and pulse generator 86 sends pulses onto the selector shift buss to resume sequential interrogation.

At the end of the telephone call, when the handset is replaced on its cradle, open line detector 105 produces a line open signal. This signal resets dial pulse counter 52 through OR gate 69; resets digit counter 61; resets area code latch 66; resets end of ring detector 72; triggers one shot multivibrator 106 and stops elapsed time counter 73. The output from one-shot 106 pulses elapsed time register 107 and transfers the elapsed time data in parallel from the elapsed time counter 73 to the elapsed time register 107.

AND gate 74 which had previously been enabled by the stand signal from end of ring detector 72 now permits the pulse from one-shot 106 to pass to set record flip flop 108 whose output enables AND gate 81. As hereinbefore explained, when the monitor unit is next interrogated, the selector output signal from selector 77 is applied to gate 81 which is now enabled as a result of the completion of the telephone call. The output from AND 81 is the record flag signal which enables AND gates 109 at the input to elapsed time register 107; AND gate 110 at the input to number register 55; AND gate 84 through OR gate 83 at the input to real time register 100; and AND gate 112 at the output to number register 55. The record flag also provides an input to inverter 59 to shut off AND 58 while enabling AND 111. This changes the path for the shift pulses to number register 55 from AND 58 to AND 111 thereby changing the shift into a shift out operation. The record flag signal is inverted by inverter 113 and the signal is placed on the recorder flag buss.

Although not shown, it is possible to eliminate AND gate 74 and the one shot multivibrator 106 and have the input to the elapsed time register 107 come directly from the record flip flop 108. The input to the record flip flop 108 can then be the same set signal feeding the real time flip flop 75 passing through an inverter. In this manner, when the end of ring detector 72 is reset, the signal thus produced also stops elapsed time counter 73 and after passing through the inverter (not shown) sets record flip flop 108. The setting of record flip flop 108 causes the contents of elapsed time counter 73 to be entered in parallel into elapsed time register 107. The output of record flip flop 108 will also enable AND gate 81.

The record flag signal is detected by the central record unit (FIG. 2*b*) where the signal inhibits the selector shift pulses by closing AND 87 along line 88. The record flag signal also starts the recorder control 114 which directs pulses from pulse generator 86 to the data control buss along line 117. It also applies the pulses to data register 115 to shift the data to be stored in data register 115 into digital recorder 116 upon a command on line 118.

The shift pulses on the data control buss are passed to the monitor unit being interrogated and pass through enabled AND gate 84 on line 98 to shift the real time data from real time register 100 into the elapsed time register 107. At the same time the shift pulses along line 119 through enabled AND gate 109 shifts the stored elapsed time data as well as the arriving real time data from elapsed time register 107 through enabled AND gate 110 to number register 55. The shift pulses are also applied on line 120 to enabled AND gate 111 through OR 60 to number register 55. All the data is shifted serially. As a result, the three registers effectively form a one long serial register wherein the data is shifted therethrough in sequence. This insures that the data will be transmitted in a specified order having the dialed number first, followed by the identification number, the elapsed time and the real time. It is understood that this arrangement could have been modified to have three independent registers operating sequentially.

The data from number register 55 passes through enabled AND 112 onto the data buss line and then along line 121 (FIG. 2*b*) to data register 115. After all the data has been recorded by the central record unit, recorder control 114 sends a reset record flag through OR 103 onto the flag reset buss. The reset signal passes to the particular unit being serviced through enabled AND gate 82 to reset record flip flop 108. This removes the record flag and stops the inhibit signal on line 88 and sequential polling continues.

Open line detector 105 resets the decoding portion of the monitor unit each time the handset is returned to its cradle. Also, the monitor unit will not set any flag if less than seven digits (or ten digits if an area code is included) is dialed. As a result, if a toll free call is made to the operator or information, the monitor unit will not request service of the central record unit and no record of the call will be entered. When the toll free call is completed, open line detector 105 resets the unit so it is initialized for future calls.

AND gate 101 at the input to real time register 100 is only enabled by the real time flag thereby permitting data from the data buss to enter the real time register 100. During the read out of data from number register 55, AND 101 is not enabled thereby preventing the data from recycling from the data buss back to the real time register 100.

The information recorded in digital recorder 116 is in a form suitable for a printout or for further processing. Since all the information concerning a particular call is sequenced, a printout could be obtained according to particular users, particular telephones, particular area codes called, or exchanges called, or particular hours or days. Also, by using the number called and the duration of the call, a simple computer could calculate the proper billing for the call.

In operation, a central record unit sequentially polls a plurality of monitor units each of which is connected to a telephone line. The monitor unit detects and decodes a number dialed onto the line, signals for entry of the identification number and after decoding it stores both numbers. When the called party picks up the phone, the monitor begins timing the call duration. Simultaneously, it requests the actual time from the clock in the central record unit. The actual time is temporarily stored in the monitor unit. When the call is completed, the monitor unit transmits the dialed number, the identification number, the time duration and the real time to the central record unit.

The individual blocks shown in FIGS. 2A and 2B are well known in the art and any of those known could be used. Four of the blocks, however, are not standard items but must be put together from other well known items. These four blocks are the sequence generator 54, the real time control 93, the recorder control 114 and the gating 67. The specific contents of these four blocks are not unique, however, and there are various ways of forming them. The heretofore described purposes of these blocks could be met by various embodiments. Nevertheless, in order to fully clarify how these blocks carry out their respective functions, there will now be described one embodiment of these four blocks. It is understood, however, that one skilled in the art could embody these blocks using different circuit arrangements.

Figure 3:
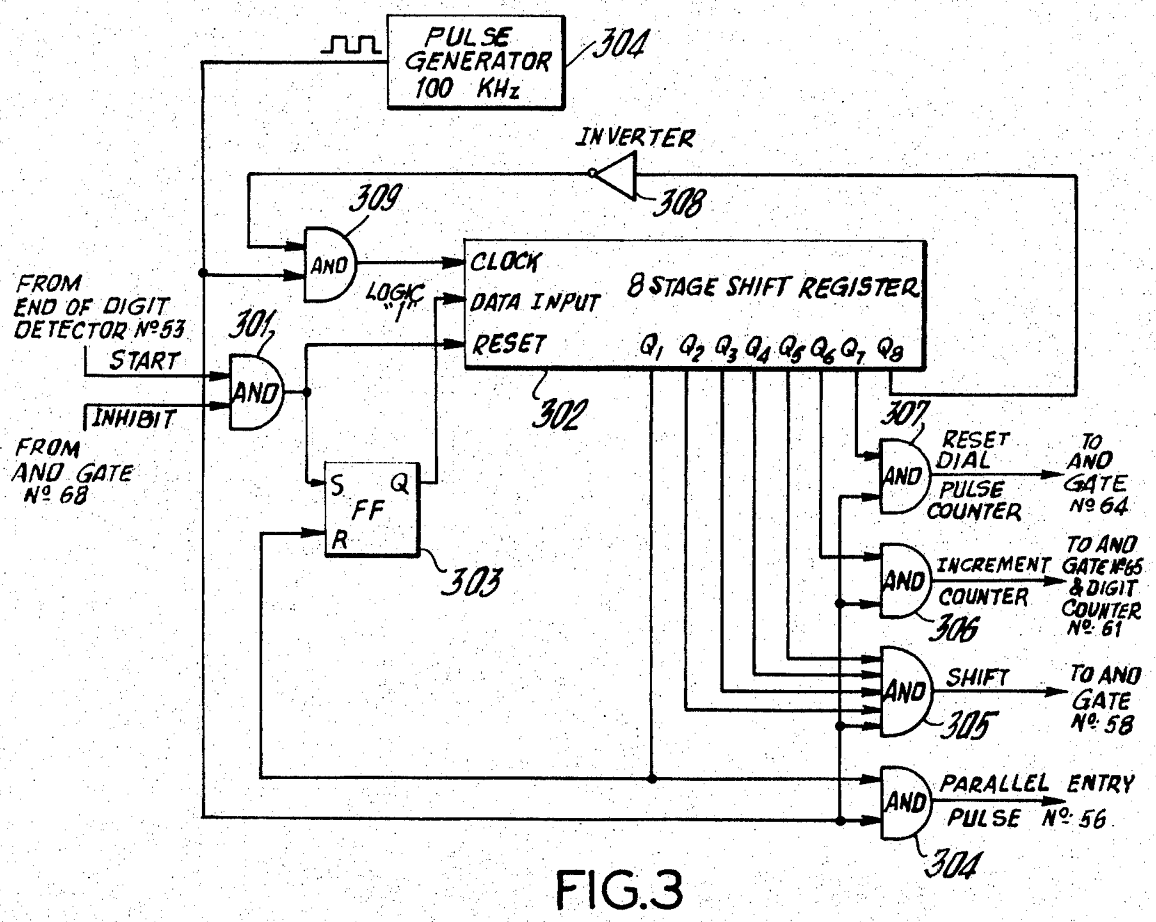
FIG. 3 represents a detailed block diagram of one embodiment of the sequence generator shown in FIG. 2.
Figure 4:
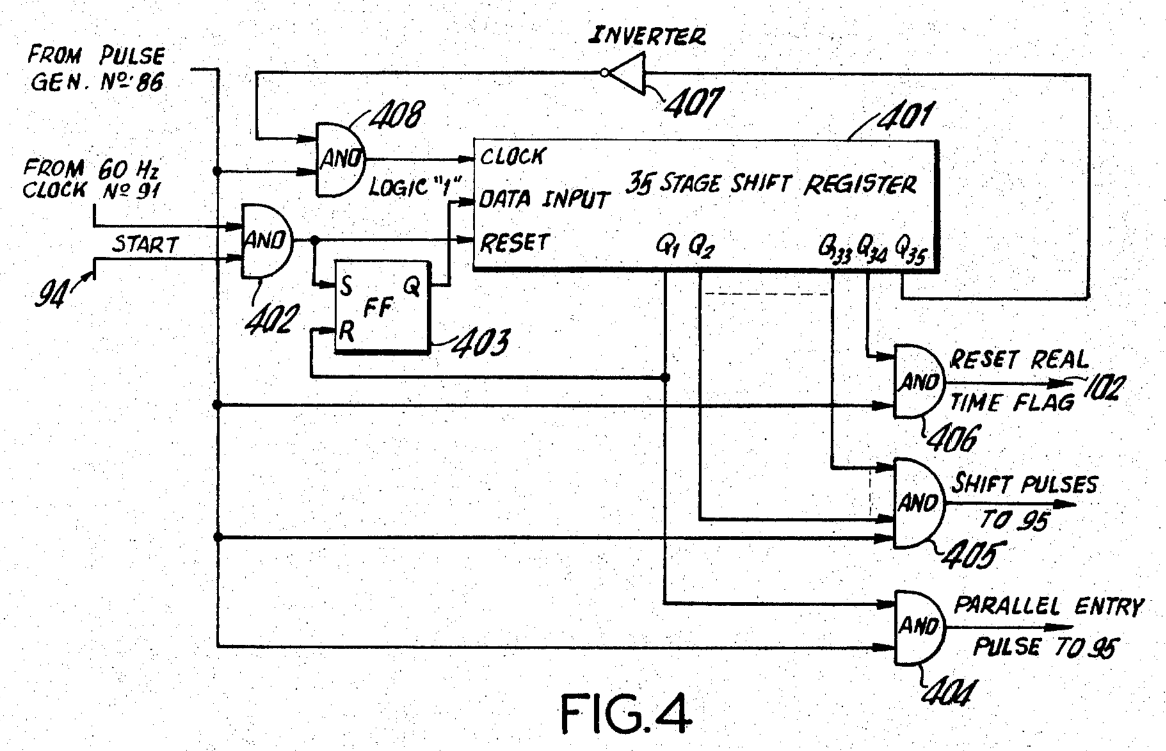
FIG. 4 represents a detailed block diagram of one embodiment of the real time control unit shown in FIG. 2.
Figure 5:
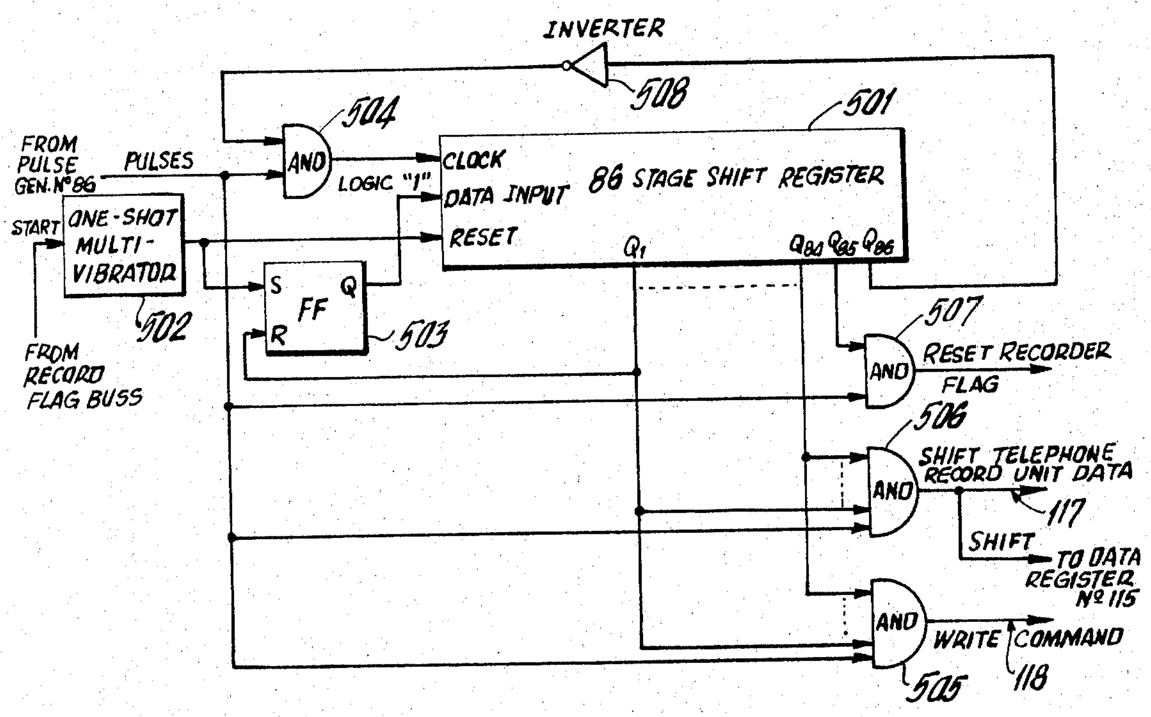
FIG. 5 represents a detailed block diagram of one embodiment of the recorder control unit shown in FIG. 2.

Referring to the FIG. 3, 4 and 5 there is shown an embodiment of the sequence generator 54, the real time control 93, and the recorder 114 respectively and each of them employ a similar element namely a shift register. The number of stages involved in the shift register can vary depending upon the number of bits of information which the shift register must act upon. In all of the three figures there is a flip-flop which inserts a logic 1 into the first position of the shift register. A clock input then shifts the logic 1 to successive stages in the shift register. An output is taken from each stage of the shift register and serves to gate the clock pulses through AND gates to provide specific outputs as explained heretofore. The last stage of the shift register is fed back through an inverter to an input AND gate such that when the shift register reaches the last stage, the logic 1 in the last stage, when inverted, serves to block the input and effectively shut off the shift register. The shift register remains in this position until a new reset pulse is sent which clears the shift register and a new logic 1 is inserted in the first stage whereupon the entire sequence repeats itself.

Although shift registers are used to embody these three blocks it will be understood that one skilled in the art could replace these with a counter and decoder and under certain conditions, depending upon the length of the words and the complexity of the other circuitry, the counter and decoder may in fact be preferable.

Referring now specifically to the sequence generator, shown in FIG. 3, it is noted that there are two inputs, one from the end of digit detector 53 and one from the AND gate 68. Four outputs are taken from the sequence generator: one a reset dial pulse counter to AND gate 69; one an increment counter pulse to digit counter 61; shift pulses on line 57 to AND gate 58, and a parallel entry pulse on line 56 to number register 55. The start signal from end of detector 53 passes through AND gate 301 to reset the shift register 302. At the same time as the shift register 302 is reset it triggers the flip-flop 303 to insert a logic 1 into the first stage of the shift register. The clock pulses from pulse generator 304 enters the AND gate 309 and serves to shift the shift register 302 through each of its stages. The output from the first stage Q1 of the shift register 302 serves to reset the flip-flop 303 thereby preventing any further logic 1's from entering into the shift register 302. The output from the first stage Q1 also gates a clock pulse through the bottom most AND gate 304 to provide the parallel entry pulse. The shift register 302 has four subsequent stages Q2 through Q5 which serve to provide the four shift pulses needed to shift the data into the number register 55 through AND gate 305. The output from Q6 of the shift register gates a clock pulse through AND gate 306 which serves as the increment counter pulse. The output from stage Q7 gates a clock pulse through AND gate 307 which serves to reset the dial pulse counter through gate 69. The 1 in the last stage Q8 of the shift register 302 is inverted by inverter 308 and blocks the clock pulses passing through the AND gate 309 to further shift the shift register 302 therefore keeping the shift register 302 dormant until a further start pulse is inserted. When an inhibit pulse is provided from AND gate 68, as heretofore explained it prevents the start pulse from passing through the AND gate 301 and therefore the shift register 302 does not respond to that digit.

Referring now to the real time control number 93 shown in FIG. 4 it is noted that there are provided three inputs, namely the start pulse on line 94, pulses from the pulse generator 86, and pulses from the 60 HZ clock 91. Three outputs are provided, one a reset real time flag on line 102, a parallel entry pulse going to the real time register 95, and shift pulses also going to real time register 95. There is again noticed a shift register 401 similar to that previously described. A 35 stage shift register is used, for example, because the length of the digital word containing the real time is for example to contain 32 bits. However, this is rather arbitrary and one skilled in the art could use a shorter or longer shift register depending upon the length of the word. The shift register 401 is started by the start pulse on line 94 passing through the AND gate 402 to reset the shift register 401. The pulse also sets the flip-flop 403 to produce a logic 1 output which is inserted in the first stage Q1 of the shift register 401. The pulses from pulse generator 86 serve to clock the shift register 401 through AND gate 408 and shift it through its various stages. The output from the forst stage Q1 of the shift register 401 serves to reset the flip-flop 403 and also serves to permit a pulse from pulse generator 86 to pass through the lower most AND gate 404 serving as the parallel entry pulse. The outputs from stages Q2 through Q33 inclusive feed the middle AND gate 405 and permit the pulses from pulse generator 86 to pass through as shift pulses to the real time register 95. The output from stage Q34 permits a pulse from pulse generator 86 to pass through the upper most AND gate 406 as the reset real time flag. The last stage Q35 of the shift register is inverted by inverter 407 and serves to block further pulses from clocking the shift register through AND gate 408 and therefore effectively retains the shift register in its state until a subsequent start pulse again will reset the shift register. As heretofore explained, the pulse from the clock 91 serves to synchronize the system and accordingly will guarantee that the shift register begins only when there exists both a start pulse as well as the synchronzing pulse from the clock 91.

With reference to the recorder control 114 shown in FIG. 5 there exists two inputs, one the start input from the record flag buss and the other pulses from the pulse generator 86. There exists four outputs: the reset recorder flag output, the shift telephone record unit data output on line 117, the shift pulses going to data register 115, and the write command pulse on line 118 to the digital recorder. The 86 stage shift register 501 serves as the major element. Again the length of the shift register is determined by the amount of information to be shifted. In this case, as heretofore described, the information includes the dialed telephone number, the identification number, the real time and the elapsed time and for example an 84 stage shift register is used. Again however, the length of the shift register can be determined by the requirements. The start signal from the record flag buss passes through a one shot multivibrator 502 to provide a single pulse for resetting the shift register. The pulse also sets the flip-flop 503 to produce a logic 1 signal in the first stage. Pulses from the pulse generator 86 pass through the AND gate 504 to clock the shift register through its various positions. The output of the first 84 stages of the shift register pass through the bottom most two AND gates 505, 506 to permit clock pulses from the pulse generator 86 to pass therethrough thereby providing write command signals on line 118 as well as shift signals on line 117 to the record unit data and shift signals to the data register 115. The outputs from the first stage Q1 also resets the flip-flop. The output from the $\overline{85}$th stage permits a single reset recorder flag pulse to pass through the AND gate 507. The output from the last stage of the shift register is inverted by inverter 508 serves to block further pulses from shifting the shift register whereby the shift register remains in this condition until the next start pulse initiates the cycle again.

Figure 6:
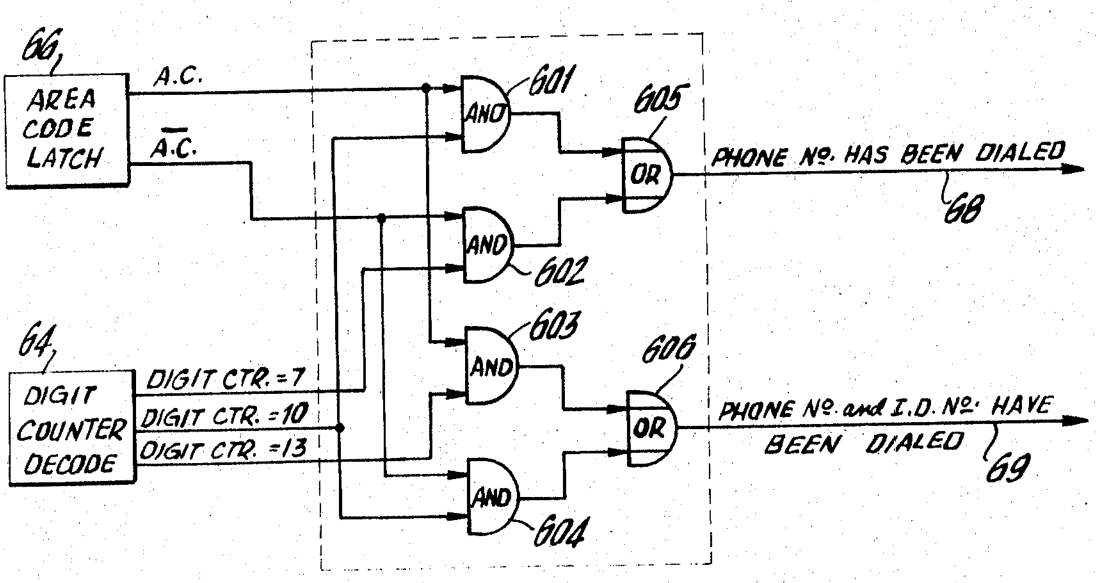
FIG. 6 represents a detailed block diagram of one embodiment of the gating unit shown in FIG. 2.

Referring now to FIG. 6, there is shown one embodiment of the gating 67. The inputs to the gating are the three outputs from digit counter decode 64 representing the seventh, tenth and thirteenth numbers dialed, and the area code or lack of area code output from area code latch 66. The output from the gating is a signal on line 68 representing the fact that the phone number has been dialed and a signal on line 69 indicating that a phone number and I.D. number have been dialed. There is shown four AND gates 601, 602, 603 and 604 and two OR gates 605, 606 comprising the entire gating. The presence of an area code signal from area code latch 66 passes through the first and third AND gates 601, 603 and the lack of the area code signal controls the second and fourth AND gates 602, 604. The digit counter indicating seven digits dialed passes through the second AND gate 602; the ten digit signal passes through the upper most and lower most AND gates 601, 604, and the thirteen digit signal passes through the third AND gate 603. In this manner the presence of an area code opens the first and third gates 601, 603 thereby permitting the tenth and thirteenth signals to pass through the OR gates 605, 606. The lack of an area code signal opens the second and fourth AND gates 602, 604 permitting the seven and ten digit signal to pass through the output OR gates 605, 606.

Although one embodiment of the four blocks, the sequence generator 54, the real time control 93, the recorder control 114 and the gating 67, have been shown. It is understood that numerous other embodiments could in fact be derived to to carry out the required results.

There has been described heretofore the best embodiment of the invention presently contemplated and it is to be understood that various changes and modifications may be made by those skilled in the art without departing from the spirit of the invention.

What is claimed:

1. A telephone monitoring system for use with a plurality of telephones coupled to telephone lines comprising, a. a plurality of monitor units each including: detection means connected in parallel to a telephone line, sensing the placing of a telephone call thereon and capable of detecting the number dialed onto the telephone line;

counting means connected to said detection means for determining the time duration of a call transmitted along the telephone line; and temporary storing means connected to said detection means for storing the real time of the commencement of the call, b. a central record unit including: clock means reading out real time; recording means for storing information; central unit control means connected to said clock means and to said recording means; and means for said central record unit sequentially interrogating each of said monitor units to determine if any of them have sensed a telephone call being placed on their respective telephone line being monitored, c. and coupling means interconnecting said plurality of monitor units with said central record unit.

whereby in response to a determination by said means for sequentially interrogating that one of said monitor units has sensed a telephone call placed on its line, said central unit control means transfers the real time from said clock means through said coupling means to the temporary storing means, and at the completion of said call said central unit control means transfers the number detected, the time duration determined and the real time temporarily stored, from the monitor unit through through said coupling means to said recording means.

2. The system as in claim 1 wherein said coupling means includes parallel buss lines interfacing between said monitor units and said central record unit and wherein all of said monitor units are connected in parallel arrangement.

3. The system as in claim 1 wherein said detection means further includes:

pulse counting means for counting the pulses as dialed onto said telephone lines, digit detector means for sensing the end of a dialed digit and producing an end of digit signal, digit counting means for counting the number of digits dialed, register means for storing the number dialed, and monitor unit control means interconnecting said last four mentioned means controlled by said end of digit signal and in response thereto storing the pulses counted by said pulse counting means into said register means, resetting said pulse counting means and advancing the count on said digit counting means.

4. The system as in claim 3 wherein said detection means further includes gating means connected to said digit counting means for providing an end of number signal.

5. The system as in claim 4 wherein said detection means further includes area code detection means connected to said pulse counting means capable of detecting the presence of a dialed area code and in response thereto setting said gating means for producing said end of number signal after ten digits have been dialed and in the absence of an area code producing said end of number signal after seven digits have been dailed.

6. The system as in claim 5 wherein said area code detection means includes means to detect the presence of a 1 or a O in the second dialed digit.

7. The system as in claim 3 wherein said detection means further includes leading 1 detection means connected to said pulse counting means and said digit counting means capable of detecting the presence of a dialed leading 1 and in response thereto inhibiting said control means from advancing the count on said digit counting means inhibiting the storage of said leading 1 in said number storage means.

8. The system as in claim 1 wherein said detection means includes line isolator means connected in parallel with the telephone line interconnecting the monitor unit with the telephone line.

9. The system as in claim 5 wherein said detection means further includes tone generation means for generating a tone signal onto the telephone line in response to said end of number signal.

10. The system as in claim 9 wherein said gating means produces a further end of number signal after additional digits have been dialed, said tone generation means stopping said tone signal in response to said further end of number signal.

11. The system as in claim 10 wherein said additional digits identify the telephone being monitored.

12. The system as in claim 10 wherein said additional digits identify the user of the telephone being monitored.

13. The system as in claim 1 wherein said detection means further includes end of ring detecting means responsive to the end of the audible ring on the telephone line, and open line detecting means responsive to the opening of the telephone line, said end of ring detector coupled to and starting said counting means and enabling said transfer of said real time from said clock to said temporary storage means and said open line detecting means coupled to and stopping said counting means and enabling the transfer from said monitor unit to said recording means.

14. The system as in claim 1 wherein said detection means includes first storage means for storing said number dialed, said counting means includes second storage means for storing the duration of the call and wherein said first storage means, said second storage means, and said temporary storage means are serially interconnected whereby data can be shifted therethrough.

15. The system as in claim 13 wherein said detection means includes means for producing a first service request signal upon the end of the audible ring on said telephone lines and a second service request signal upon the opening of the telephone line at the completion of a call.

16. The system as in claim 15 wherein said means for sequentially interrogating includes means to inhibit further interrogation upon receiving said first and second service request signals in response to the interrogation of the monitor unit producing said signals, and resuming interrogation after said unit has been serviced.

17. The system as in claim 16 wherein said transfer of said real time is in response to said first service request signal and said transfer from said monitor unit is in response to said second service request signal.

18. The system as in claim 1 wherein said means for sequentially interrogating includes:

a plurality of selection means each one of which is associated with one of said monitor units, said selection means being serially connected such that the output of the selection means of one unit enables the input of the selection means of the next unit.

19. The system as in claim 18 wherein said selection means is a one bit shift register and wherein said means for sequentially interrogating further includes shifting means for causing the outputs of the selection means to sequentially shift from one selection means to the next.

20. The system as in claim 19 wherein said sequentially interrogating means produce a series of shift signals and wherein said coupling means include a selector shift buss line which transfers said shift signals sequentially to successive monitor units.

21. The system as in claim 20 wherein said detection means produces a real time flag signal after the end of the audible ring on the telephone lines and wherein said coupling means further include a real time flag buss and a data buss wherein said real time flag buss transfers said real time flag to said central record unit and said data buss transfers the real time from said clock means to said temporary means, both transfers being subsequent to the monitor unit receiving a shift signal.

22. The system as in claim 21 wherein said detection means produces a recorder flag signal upon the opening of the telephone line at the completion of a call and wherein said coupling means further include a recorder flag buss which transfers said recorder flag to said central record unit and wherein said data buss transfers the number dialed, the time duration determined and the real time temporarily stored from said monitor unit to said recording means, both transfers being subsequent to the monitor unit receiving a shift signal.

23. The system as in claim 22 wherein said central unit control means further includes reset means for producing a reset signal, said coupling means further includes a data control buss and a flag reset buss, whereby upon receipt of a flag signal, said shift signals are transferred from said central record unit to said monitor unit by said data control buss and said reset signal is transferred from said central record unit to said monitor unit by said flag reset buss after said monitor unit has been serviced.

24. The system as in claim 1, wherein said clock means is capable of reading out the time of day, the day of the month and the month.

25. The system as in claim 1, wherein said monitor unit generates a first service request signal at the end of the audible ring on the telephone line and wherein said central unit control means includes first control means which in response to detecting said first request signal inhibits further interrogation, controls said transfer of said real time from said clock means to said temporary storage means and then resumes sequential interrogation.

26. The system as in claim 25 wherein said monitor unit generates a second service request signal upon the opening of the telephone line connection at the completion of a call and wherein said central unit control means further includes second control means which in response to detecting said second service request signal inhibits further interrogation, controls said transfer of information from said monitor unit to said recording means and then resumes sequential interrogation.

27. The system as in claim 1 wherein said recording means is a digital recorder.

28. In a telephone system including a plurality of telephones coupled to telephone lines, a plurality of monitor units each coupled to a respective one of the lines, each monitor unit including means to detect a telephone number dialed onto one of the telephone lines, means to detect an identification number dialed onto said telephone line, means to determine the time duration of a call dialed onto said line, and means to record the real time of occurrence of said call; and a central record unit containing a real time clock, said central record unit further including means to sequentially interrogate said plurality of monitor units, said record unit also including recording means for recording the information contained in said monitor unit.

29. A telephone system as in claim 28 wherein said real time of occurrence is entered into said monitor unit from said real time clock.

* * * * *